(12) United States Patent
Haartsen et al.

(10) Patent No.: US 8,159,990 B2
(45) Date of Patent: Apr. 17, 2012

(54) WIRELESS AUDIO DATA DISTRIBUTION USING BROADCAST AND BIDIRECTIONAL COMMUNICATION CHANNELS

(75) Inventors: Jacobus Cornelis Haartsen, Hardenberg (NL); Dick de Jong, Emmen (NL)

(73) Assignee: Sony Ericsson Mobile Communications AB (SE)

( * ) Notice: Subject to any disclaimer, the term of this patent is extended or adjusted under 35 U.S.C. 154(b) by 550 days.

(21) Appl. No.: 12/402,230

(22) Filed: Mar. 11, 2009

(65) Prior Publication Data

US 2010/0232618 A1 Sep. 16, 2010

(51) Int. Cl.
*H04B 7/00* (2006.01)
*H04Q 5/22* (2006.01)

(52) U.S. Cl. ........ 370/315; 370/312; 370/329; 370/330; 381/80; 455/11.1; 455/41.2; 714/748; 714/776; 714/E11.001; 714/E11.021

(58) Field of Classification Search .................. 370/312, 370/315, 329, 330; 381/80; 455/11.1, 41.2; 714/748, 776, E11.001, E11.021
See application file for complete search history.

(56) References Cited

U.S. PATENT DOCUMENTS

| | | | |
|---|---|---|---|
| 7,095,719 B1 | 8/2006 | Wilhelmsson et al. | |
| 7,827,458 B1 * | 11/2010 | Salsbury et al. | 714/748 |
| 2006/0041815 A1 * | 2/2006 | Haymond | 714/748 |
| 2007/0153806 A1 | 7/2007 | Celinski et al. | |
| 2008/0089268 A1 * | 4/2008 | Kinder et al. | 370/315 |
| 2008/0238629 A1 * | 10/2008 | Gonikberg | 340/10.4 |

OTHER PUBLICATIONS

Notification of Transmittal of the International Search Report and the Written Opinion of the International Searching Authority, or the Declaration; International Search Report; Written Opinion of the International Searching Authority corresponding to International Application No. PCT/IB2009/054017; Date of Mailing: Feb. 1, 2011; 12 pages.
International Preliminary Report on Patentability for corresponding to International Application No. PCT/IB2009/054017; Date of Mailing: Sep. 22, 2011; 8 pages.

* cited by examiner

*Primary Examiner* — Dao H Nguyen
(74) *Attorney, Agent, or Firm* — Myers Bigel Sibley & Sajovec, P.A.

(57) ABSTRACT

Embodiments include a method of communicating an audio stream from an audio source terminal to a plurality of speaker terminals. A broadcast channel is established for communication from an audio source terminal to a plurality of speaker terminals. A plurality of bidirectional point-to-point control channels are established for controlling wireless communications between the audio source terminal and the speaker terminals, where each of the point-to-point control channels interconnect the audio source terminal and a different one of the speaker terminals. An audio stream is transmitted as a sequence of blocks of audio data in messages from the audio source terminal through the broadcast channel for receipt by all of the speaker terminals. A quality of reception feedback message is received at the audio source terminal from individual ones of the speaker terminals through respective ones of the point-to-point control channels. The audio data messages are adapted for transmission from the audio source terminal through the broadcast channel in response to the quality of reception feedback message.

20 Claims, 4 Drawing Sheets

WIRELESS AUDIO DATA DISTRIBUTION USING BROADCAST AND BIDIRECTIONAL COMMUNICATION CHANNELS

FIELD OF THE INVENTION

The present invention relates to electronic audio devices and, more particularly, to streaming audio signals to remote speakers through a wireless interface.

BACKGROUND OF THE INVENTION

It is becoming increasingly more commonplace for electronic devices to provide wireless distribution of audio signals as improved compression techniques are becoming available that allow lower communication rates and longer playing time and as power efficiencies improve to allow increased playtime from batteries.

For example, headsets are available that can receive wireless streaming stereo audio from wireless phones, digital audio music players, and other audio source devices. Separate audio data for the left and right stereo channels can be separately transmitted by an audio source device through frames of the wireless air interface to a headset. In the headset, the audio data is decoded and provided to the speakers through associated amplifiers and cabling.

SUMMARY OF THE INVENTION

Some embodiments of the present invention are directed to methods of communicating an audio stream from an audio source terminal to a plurality of speaker terminals. A broadcast channel is established for communication from an audio source terminal to a plurality of speaker terminals. A plurality of bidirectional point-to-point control channels are established for controlling wireless communications between the audio source terminal and the speaker terminals, where each of the point-to-point control channels interconnect the audio source terminal and a different one of the speaker terminals. An audio stream is transmitted as a sequence of blocks of audio data in messages from the audio source terminal through the broadcast channel for receipt by all of the speaker terminals. A quality of reception feedback message is received at the audio source terminal from individual ones of the speaker terminals through respective ones of the point-to-point control channels. The audio data messages are adapted for transmission from the audio source terminal through the broadcast channel in response to the quality of reception feedback message.

In some further embodiments, a quality of receipt polling message is transmitted from the audio source terminal to each of the speaker terminals through respective ones of the point-to-point control channels to initiate transmission of the quality of reception feedback message from the speaker terminals to the audio source terminal.

In some further embodiments, the audio data messages is adapted for transmission from the audio source terminal to the speaker terminals by retransmitting each audio data message from the audio source terminal through the broadcast channel to all of the speaker terminals in response to the quality of reception feedback message received from any one of the speaker terminals indicating that a quality at which the messages are received is below a first threshold level.

In some further embodiments, the audio data messages is adapted for transmission from the audio source terminal to the speaker terminals by increasing a number of times that each audio data message is retransmitted from the audio source terminal through the broadcast channel to all of the speaker terminals in response to the quality of reception feedback message received from any one of the speaker terminals indicating that a quality at which the audio data messages is received is below a second threshold level that is lower than the first threshold level. Each audio data message is retransmitted adjacent to the same originally transmitted audio data message without any intervening other message containing other audio data.

In some further embodiments, the audio data messages is adapted for transmission from the audio source terminal to the speaker terminals by: applying a first modulation technique by the audio source terminal to modulate the audio data messages for transmission while the quality of reception feedback message received from all of the speaker terminals indicates that the quality at which the audio data messages is received is above a threshold level; and applying a second modulation technique, which is more tolerate of noisy communications through the broadcast channel than the first modulation technique, by the audio source terminal to modulate the audio data messages for transmission in response to the quality of reception feedback message received from any one of the speaker terminals indicating that the quality at which the audio data messages is received is below the threshold level.

In some further embodiments, the audio data messages is adapted for transmission from the audio source terminal to the speaker terminals by: applying Quadrature Phase Shift Keying (QPSK) by the audio source terminal to modulate the audio data messages for transmission while the quality of reception feedback message received from all of the speaker terminals indicates that the quality at which the audio data messages is received is above a threshold level; and applying Guassian Frequency-Shift keying (GFSK) by the audio source terminal to modulate the audio data messages for transmission in response to the quality of reception feedback message received from any one of the speaker terminals indicating that the quality at which the audio data messages is received is below the threshold level.

In some further embodiments, quality of reception feedback messages are received at the audio source terminal from individual ones of the speaker terminals comprises applying GFSK demodulation to quality of reception feedback messages received through respective ones of the point-to-point control channels without changing to another modulation technique irrespective of the quality of reception feedback message.

In some further embodiments, modulation technique information, which identifies what modulation technique will be applied by the audio source terminal, is transmitted from the audio source terminal to the speaker terminals through respective ones of the point-to-point control channels in response to the audio source terminal changing between the first and second type of modulation that it applies to the transmitted messages containing the audio data.

In some further embodiments, the audio data messages are adapted for transmission from the audio source terminal to the speaker terminals by the audio source terminal applying a first forward error correction (FEC) code to the audio data messages for transmission while the quality of reception feedback message received from all of the speaker terminals indicates that the quality at which the audio data messages is received is above a threshold level, and applying a second FEC code, which enables correction of a greater number of errors than the first FEC code, to the audio data messages for transmission in response to the quality of reception feedback message received from any one of the speaker terminals indicating that the quality at which the audio data messages is received is below the threshold level.

In some other embodiments, an audio source terminal includes a RF transceiver circuit and a controller circuit. The RF transceiver circuit is configured to communicate with a plurality of speaker terminals through a broadcast channel and a plurality of bidirectional point-to-point control channels. The controller is configured to communicate through the RF transceiver circuit to establish the broadcast channel and the plurality of bidirectional point-to-point control channels to the speaker terminals. Each of the point-to-point control channels interconnect the audio source terminal with a different one of the speaker terminals. The controller is further configured to transmit an audio stream as a sequence of blocks of audio data in messages from the audio source terminal through the broadcast channel for receipt by all of the speaker terminals, to receive a quality of reception feedback message from individual ones of the speaker terminals through respective ones of the point-to-point control channels, and to adapt the audio data messages that are transmitted to the speaker terminals through the broadcast channel in response to the quality of reception feedback message.

In some further embodiments, the RF transceiver circuit comprises a Bluetooth transceiver. The controller is further configured to establish the broadcast channel as a Bluetooth unidirectional broadcast channel from the RF transceiver circuit to the speaker terminals, to establish the point-to-point control channels each as a Asynchronous Connectionless Link (ACL) Link Manager Protocol (LMP) channel between the RF transceiver circuit and a different one of the speaker terminals, to transmit the audio data messages according to an Advanced Audio Distribution Profile (A2DP) protocol through the broadcast channel for receipt by all of the speaker terminals, to repetitively transmit a quality of receipt polling message to each of the speaker terminals to initiate transmission of quality of reception feedback messages from each of the speaker terminals to the audio source terminal, and to adapt the audio data messages that are transmitted to the speaker terminals through the broadcast channel in response to the quality of reception feedback message.

In some further embodiments, the controller is further configured to repetitively transmit the quality of receipt polling message to each of the speaker terminals through respective ones of the point-to-point control channels to initiate transmission of quality of reception feedback messages from each of the speaker terminals to the audio source terminal through the respective point-to-point control channels.

In some further embodiments, the controller is further configured to repetitively transmit a quality of receipt polling message to each of the speaker terminals through the broadcast channel to initiate transmission of quality of reception feedback messages from each of the speaker terminals to the audio source terminal through the respective point-to-point control channels.

In some further embodiments, the controller is further configured to retransmit each audio data message from the audio source terminal through the broadcast channel to all of the speaker terminals in response to the quality of reception feedback message received from any one of the speaker terminals indicating that a quality at which the audio data messages is received is below a first threshold level In some further embodiments, the controller is further configured to increase a number of times that each audio data message containing the audio data is retransmitted from the audio source terminal through the broadcast channel to all of the speaker terminals in response to the quality of reception feedback message received from any one of the speaker terminals indicating that a quality at which the audio data messages is received is below a second threshold level that is lower than the first threshold level, wherein each audio data message is retransmitted adjacent to the same originally transmitted audio data message without any intervening other message containing other audio data.

In some further embodiments, the controller is further configured to control the Bluetooth transceiver to apply Quadrature Phase Shift Keying (QPSK) to modulate the transmitted audio data messages in response to the quality of reception feedback message received from all of the speaker terminals indicating that the quality at which the audio data messages is received is above a threshold level, and to apply Guassian Frequency-Shift keying (GFSK) to modulate the transmitted audio data messages in response to the quality of reception feedback message received from any one of the speaker terminals indicating that the quality at which the audio data messages is received is below the threshold level.

In some further embodiments, the Bluetooth transceiver is further configured to apply GFSK to modulate the quality of receipt polling messages that are transmitted to each of the speaker terminals without changing to another modulation technique irrespective of the quality of reception feedback messages.

In some further embodiments, the controller is further configured to apply a first forward error correction (FEC) code to the audio data messages for transmission while the quality of reception feedback message received from all of the speaker terminals indicates that the quality at which the audio data messages is received is above a threshold level, and to apply a second FEC code, which enables correction of a greater number of errors than the first FEC code, to the audio data messages for transmission in response to the quality of reception feedback message received from any one of the speaker terminals indicating that the quality at which the audio data messages is received is below the threshold level.

In some other embodiments, a speaker terminal includes a RF transceiver circuit, a speaker, and a controller. The RF transceiver circuit is configured to communicate with an audio source terminal through a unidirectional broadcast channel and a bidirectional point-to-point control channel. The controller is configured to communicate through the RF transceiver circuit to establish the unidirectional broadcast channel and the bidirectional point-to-point control channel to the audio source terminal, to receive an audio stream as a sequence of blocks of audio data in messages from the audio source terminal through the unidirectional broadcast channel, and to respond to a quality of receipt polling message received from the audio source terminal through the bidirectional point-to-point control channel by transmitting a quality of reception feedback message through the bidirectional point-to-point control channel to the audio source terminal, and to convert the sequence of blocks of audio data received in the messages into an audio stream that is played through the speaker.

In some further embodiments, the controller is further configured to identify whether an audio data message received from the audio source terminal is repetitive of an earlier received audio data message, and to respond to identification of a repetitive audio data message by determining an error metric for the audio data contained in original and the repetitive audio data messages and converting one of those audio data messages having a lower error metric into the audio stream that is played through the speaker.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Figure 1:
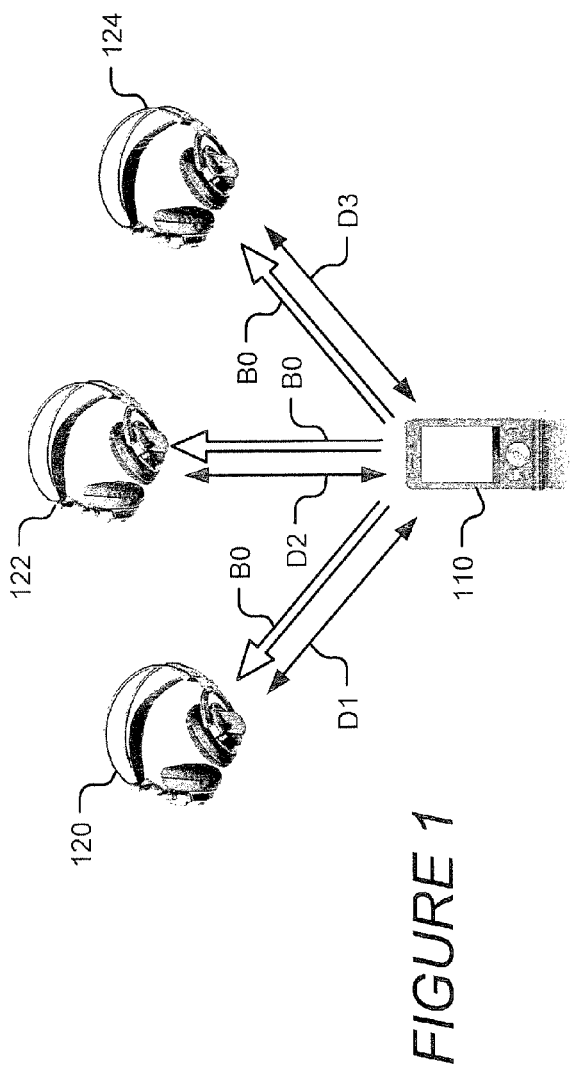
FIG. 1 is a diagram of a wireless audio distribution system that is configured to operate in accordance with some embodiments of the present invention.

The present invention now will be described more fully hereinafter with reference to the accompanying figures, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, third, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by hardware and/or in software (including firmware, resident software, micro-code, etc.), referred to herein as "circuitry" or "circuit". For example, some of the functionality my be implemented in computer program instructions that may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks. The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

A computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Although some of the diagrams include arrows on communication paths to show a primary direction of communication, it is to be understood that communication may occur in the opposite direction to the depicted arrows.

As used herein, a "wireless communications terminal" or "terminal" may include Bluetooth, cellular, wireless local area network (WLAN), and/or other wireless communications capabilities. Various embodiments of the present invention are described herein in the context of a wireless communication terminal that includes Bluetooth communications technology. However the invention is not limited thereto, as it may be incorporated within other types of communication technologies.

For example, other embodiments of the invention may be used in terminals that include WLAN communication capabilities and/or cellular communication capabilities. A cellular communication terminal may be configured to communicate according to one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS).

An emerging feature for terminals is enabling users to share music with friends by streaming stereo sound from one terminal to multiple wireless speaker headsets or other terminals. A terminal may be configured to discover the presence of nearby headsets and to then establish a communication link and stream music from the master terminal to the slave headsets.

A master terminal may be configured to setup N individual point-to-point communication links to N slave terminals (e.g., speaker headsets and/or phones) and to simultaneously transmit the music stream in parallel over all point-to-point communication links. This may provide a robust fault-tolerant approach because each point-to-point communication link can operate with separate Automatic Repeat-reQuest (ARQ) handshaking that allows the master terminal to receive responsive ARQ notifications from the slave terminals and to retransmit missed or incorrectly received audio data messages. However, when implemented through a Bluetooth piconet, the number (N) of slave terminals may be very limited (perhaps at most N=2), because the limited Bluetooth Subband Codec (SBC) compression (e.g., 350 kb/s) and piconet capacity (e.g., up to 1.4 Mb/s) may not allow sufficient additional bandwidth for much retransmission, if any, of audio data messages. For example, a Bluetooth SBC piconet with a single retransmission capability would require 700 kb/s of resource, so that for two slave terminals (i.e., N=2) requiring retransmission of audio data the maximum piconet bandwidth capacity of 1.4 Mb/s is reached.

The present inventors have realized, the master terminal may transmit the audio data messages through a broadcast communication channel to enable parallel receipt by all of the slave terminals and associated reduction in communication bandwidth. For example, a master terminal may transmit an audio stream through a Bluetooth control channel to up to seven slave terminals. However, the only broadcast channel that is defined for use in a Bluetooth piconet is for transmitting control data (signaling), according to the Link Manager Protocol (LMP), from a master terminal to slave terminals. The Bluetooth broadcast channel is by definition unidirectional and, therefore, would not be available for use by the slave terminals to transmit an ACK/NACK message or other quality of reception feedback responsive message to the master terminal to indicate that retransmission of an audio data message is needed. Moreover, a broadcast channel can be sensitive to adverse channel conditions (e.g., multipath/co-channel interference) that depend on the slave location and therefore may differ per slave.

Some embodiments are directed to accomplishing efficient transmission of an audio stream from a master terminal to a plurality of slave terminals while also enabling efficient transmission of quality of reception feedback messages from the slave terminals to the master terminal. In accordance with some embodiments, a unidirectional broadcast channel is established between an audio source terminal and a plurality of speaker terminals. A speaker terminal may include, but is not limited to, a headset, a phone, or another terminal that is configured to receive and play an audio stream from another terminal. A plurality of bidirectional point-to-point control channels are established between the audio source terminal and the speaker terminals, where each of the point-to-point control channels interconnect the audio source terminal and a different one of the speaker terminals. An audio stream is transmitted as a sequence of blocks of audio data in messages from the audio source terminal through the broadcast channel for receipt by all of the speaker terminals. The speaker terminals generate information that indicates a quality at which the audio data messages are received from the audio source terminal. For example, the quality information may be generated based on an error rate from decoding of the audio data and/or based on checking a checksum and/or parity bit received as part of audio data messages, or it may be based on the rate of missed packets. The quality of reception feedback message is received by the audio source terminal from individual ones of the speaker terminals through respective ones of the point-to-point control channels. The audio source terminal responds to the quality of reception feedback messages by adapting the audio data messages that it transmits through the broadcast channel to the speaker terminals.

The audio source terminal can, for example, began retransmitting audio data messages and/or adapt the modulation and/or coding is used to transmit audio data messages to the speaker terminals in response to the quality of reception feedback messages. The audio source terminal may apply unconditional retransmissions; that is, the audio source terminal may resend the same broadcast message Nbc times to the speaker terminals when at least one the speaker terminals indicates that one or more of the audio data messages was received with errors or not received at all. The audio source terminal may increase the number of times Nbc that each of the audio data message is retransmitted in response to a quality of reception feedback message indicating that the quality has decreased below one or more threshold values, and it may decrease the number of times Nbc that each of the audio data message is retransmitted in response to the quality of reception feedback message indicating that the quality has increased above one or more threshold values.

These and further embodiments of the present invention will now be described with reference to FIGS. 1-4.

FIG. 1 is a diagram of a wireless audio data distribution system that is configured to operate in accordance with some embodiments of the present invention. Referring to FIG. 1, the system can include an audio source terminal 110 (e.g., a digital audio player) and a plurality of speaker terminals 120, 122, and 124 (e.g. headsets). The audio source terminal 110 can assign a unique slave address (LT_ADDR≠0) to the speaker terminals 120, 122, and 124 and establish dedicated point-to-point ACL/Link Manager Protocol (LMP) channels to each of the speaker terminals 120, 122, and 124. For example, as shown in FIG. 1, the audio source terminal 110 has established three point-to-point bidirectional communication channels "D1", "D2", and "D3" (hereinafter "bidirectional control channels D1, D2, and D3") for bidirectional communications with the three speaker terminals 120, 122, and 124, respectively.

The audio source terminal 110 can also establish a unidirectional broadcast channel "B0" (hereinafter "broadcast channel B0") to the speaker terminals 120, 122, and 124. Whatever messages are transmitted by the audio source terminal 110 through the broadcast channel B0 can be received by all of the speaker terminals 120, 122, and 124, however the speaker terminals 120, 122, and 124 cannot transmit messages to the audio source terminal 110 through the broadcast channel B0.

The control channels D1, D2, and D3 are instrumental in establishing a piconet between the audio source 110 and the speaker terminals 120, 122, and 124. They are subsequently used to establish the broadcast channel B0 between the audio source and the terminal speaker. Furthermore, they take care of link supervision during communications. Finally, they provide feedback information about the audio reception which can be used to adapt the broadcast channel B0.

The audio source terminal 110 can include an Advanced Audio Distribution Profile (A2DP) identifier in the messages containing the audio data and transmits it messages according to the A2DP protocol through the broadcast channel B0 for receipt by all of the speaker terminals 120, 122, and 124.

It is noted that the quality of the reception of audio data messages through the broadcast channel B0 can differ considerably among the speaker terminals 120, 122, and 124. The quality of the reception can depend upon the particular channel propagation conditions between the audio source terminal 110 and the respective speaker terminals 120, 122, and 124.

Figure 2:
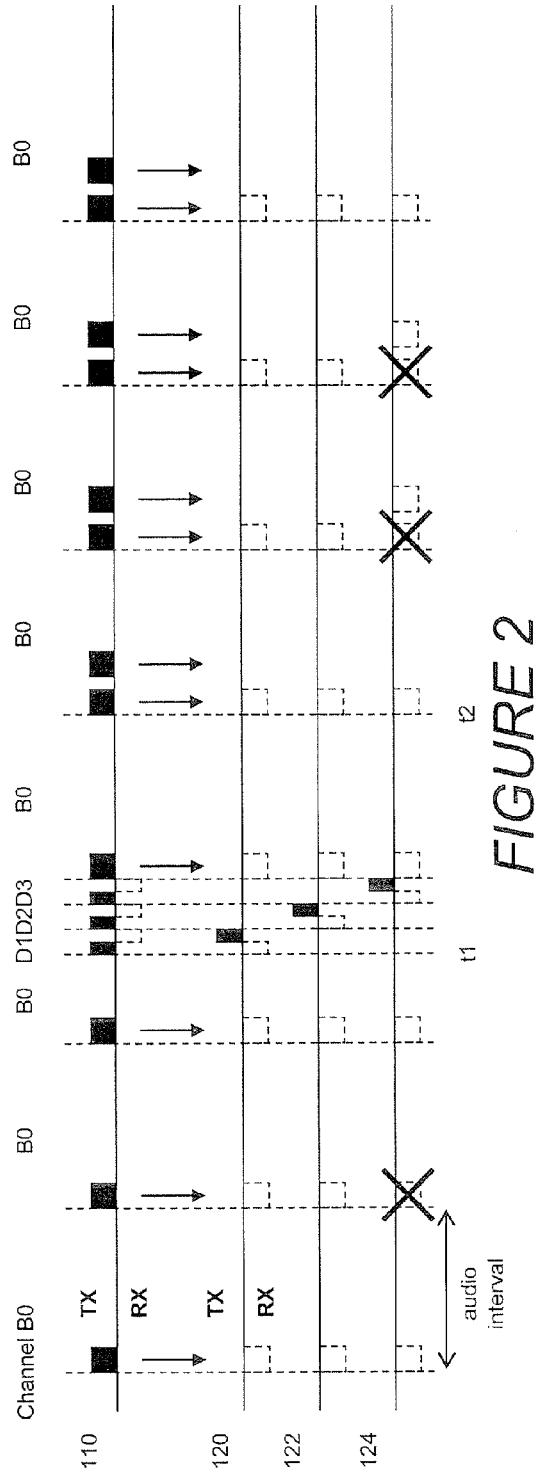
FIG. 2 is a data flow and timing diagram of a Bluetooth piconet audio distribution system operating in accordance with some embodiments of the present invention.

FIG. 2 is a data flow and timing diagram of a Bluetooth piconet audio distribution system operating in accordance with some embodiments of the present invention. Referring to FIG. 2, the audio source terminal 110 can be configured to initially operate (before time t1) as if good channel conditions exist to the speaker terminals 120, 122, and 124. Consequently, the audio source terminal 110 applies Quadrature Phase Shift Keying (QPSK) to modulate the audio data messages that are transmitted through the broadcast channel B0, and no retransmissions of the audio data messages are made. During an audio interval (between times t1 and t2), only a single transmission appears. As shown in FIG. 2, the second audio data message transmission that is broadcasted through the broadcast channel B0 is not properly received by the third speaker terminal 124 (as indicated by the "X").

Figure 3:
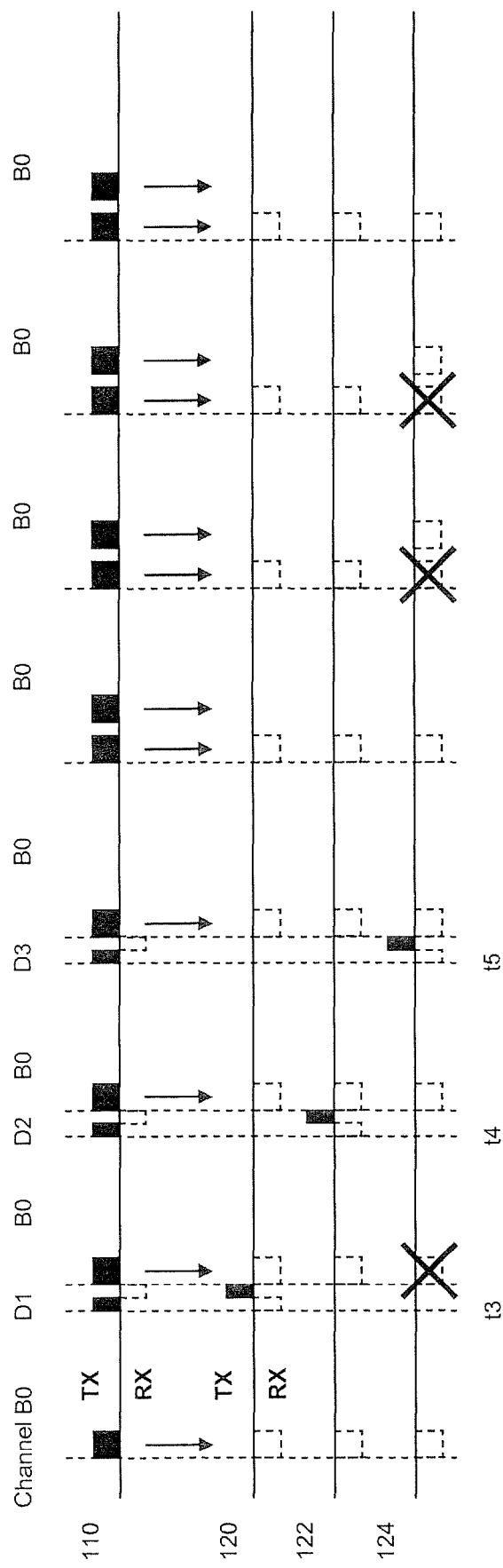
FIG. 3 is another data flow and timing diagram of a Bluetooth piconet audio distribution system operating in accordance with some embodiments of the present invention.

At time t1, the audio source terminal 110 sequentially polls the speaker terminals 120, 122, and 124 to have them generate and respond with quality of reception feedback response messages through the respective bidirectional control channels D1, D2, and D3. In FIG. 2, all speaker terminals 120, 122, and 124 are shown as being polled in a single audio interval, however the polling may be distributed over several intervals, for example as shown in FIG. 3. The polling can be carried out periodically but at a low duty cycle, such as, for example, once every 1 or 2 seconds. When the Bluetooth piconet supports a 350 kb/s SBC rate on the broadcast channel B0, there is sufficient capacity remaining in the piconet for exchange of control information between the audio source terminal 110 and the speaker terminals 120, 122, and 124. Preferably, the control channels D1, D2, D3 apply the SNIFF mode in Bluetooth, which means they are operating at a low duty cycle. The SNIFF intervals of the different links may be identical, but the SNIFF events are time staggered as is shown in FIG. 3. Preferably, the SNIFF events for different speaker terminals end up in different audio intervals on B0 (t3, t4, and t5).

The audio source terminal 110 and the speaker terminals 120, 122, and 124 can apply a robust scheme (Gaussian Frequency-Shift keying (GFSK) and DM1 packets) to modulate the communication's therebetween, and/or may transmit a ARQ response message from the receiving terminal to the transmitting terminal to acknowledge proper receipt of communications.

For example, each of the speaker terminals 120, 122, and 124 generates and transmits information that indicates the quality at which the audio data messages are received through the broadcast channel B0. For example, speaker terminals 120 and 122 can indicate that they have a satisfactory link quality in that the audio data messages are properly received (e.g., received with less than a threshold number of errors per message), but the other speaker terminal 124 can have an unsatisfactory link quality so that audio data messages are not properly received (e.g. received with more than a threshold number of errors per message or no message received at all). The audio source terminal 110 can respond to the quality of reception feedback message from the speaker terminal 124 indicating such degraded link quality by initiating at time t2 and onwards operations to retransmit all broadcasted audio data messages at least two times (i.e., transmission of the original audio data message and then retransmission of the same audio data message without any intervening other message containing other audio data). It will be understood that the terminal speakers 120, 122, and 124 only need to receive the second broadcast packet when the reception of the first broadcast packet has failed. That is, a speaker terminal can enter a low power suspend mode for the remainder of the audio interval when it has received at least one correct packet.

When the Bluetooth piconet supports a 350 kb/s SBC rate on the broadcast channel B), there is sufficient capacity remaining in the piconet for exchange of control information between the audio source terminal 110 and the speaker terminals 120, 122, and 124. The audio source terminal 110 may signal over the bidirectional control channels D1, D2, and D3 that the number Nbc of retransmitted audio data messages has increased from 1 to 2. Because the reception quality in speaker terminals 120 and 122 was satisfactory, they may not listen for the retransmitted audio data messages and/or may receive and ignore the retransmitted audio data messages. By ignoring the retransmitted audio data messages, the speaker terminals 120 and 122 may remain in a lower-power standby state for longer durations (e.g., remain in the lower-power standby state during the times that the repetitive audio messages are transmitted) and may, thereby, conserve power. If the links between one or both of the speaker terminals 120 and 122 deteriorates more than a threshold amount (e.g., number of bit errors exceeds a defined threshold value or rate of missed packets exceeding a defined threshold), the associated speaker terminal may respond thereto by using the retransmitted audio data messages without explicit negotiation with (e.g., requesting from) the audio source terminal 110. The speaker terminal 124 may selectively listen for a retransmitted audio data message when the original audio data message transmission was received with an insufficient quality (e.g., bit error or packet error exceeds a defined threshold value).

If the broadcast channel B0 link between from the audio source terminal 110 and the speaker terminal 124 degrades below one or more defined threshold values, the audio source terminal 110 may further increase the number Nbc of retransmitted audio data messages. For example, the audio source terminal 110 may increase the number of retransmitted audio data messages from 2 to 3 when the speaker terminal 124 reports that one or more audio data messages have been received with less than a threshold quality level, and may further increase the number of retransmitted audio data messages from 3 to 4 when the speaker terminal 124 reports that one or more audio data messages have been received with less than another threshold quality level.

The audio source terminal 110 may vary the type of modulation in response to the quality of reception feedback message received from one or more of the speaker terminals 120, 122, and 124, such as by changing from applying QPSK modulation to the audio data messages for transmission, to instead applying GFSK modulation to the audio data messages. Alternatively or additionally, the audio source terminal 110 may begin using or varying the level of forward-error-correction (FEC) coding that it applies to audio data messages for transmission in response to the quality of reception feedback message received from one or more of the speaker terminals 120, 122, and 124.

The audio source terminal 110 may apply a first forward error correction (FEC) code to the audio data messages for transmission while the quality of reception feedback message received from all of the speaker terminals 120, 122, and 124 indicates that the quality at which the audio data messages is received is above a threshold level, and apply a second FEC code, which enables correction of a greater number of errors than the first FEC code, to the audio data messages for transmission in response to the quality of reception feedback message received from any one of the speaker terminals 120, 122, and 124 indicating that the quality at which the audio data messages is received is below the threshold level.

The audio source terminal 110 may transmit modulation technique information and/or FEC coding information, which identifies what modulation technique and/or FEC coding algorithm that it will be applying, to the speaker terminals 120, 122, and 124 through respective ones of the bidirectional control channels D1, D2, and D3, respectively, in response to the audio source terminal 110 changing between the different modulation techniques and/or FEC coding algorithms that it applies to the transmitted audio data messages. Alternatively, this information may be broadcasted through the broadcast channel B0. The modulation technique information and/or FEC coding information may be included within the packet header of broadcast messages transmitted from the audio source terminal 110.

As is shown in FIG. 2 are the communications B0, D1, D2, and D3 separated in time, that is a Time Division Multiplexing (TDM) scheme is applied. In other embodiments, a different separation approach can be used for example separation in frequency (Frequency Division Multiplexing FDM) or in code (Code Division Multiplexing CDM).

FIG. 3 is a block diagram of a speaker terminal 300 that is configured in accordance with some embodiments of the present invention. Referring to FIG. 3, the speaker terminal 300, which may be a Bluetooth speaker headset (e.g., speaker terminal 120, 122, and/or 124), includes a RF transceiver circuit (RF front end) 310, a controller circuit 320, a digital to analog converter (DAC) 340, and a speaker 360. The RF transceiver 310 is configured to communicate through an antenna 350 via wireless Bluetooth communication channels with the audio source terminal 110.

The controller 320 is configured to communicate through the RF transceiver circuit 310 to establish a unidirectional broadcast channel B0 and a bidirectional point-to-point control channel D1, D2, or D3 (e.g., as Asynchronous Connectionless Link (ACL) Link Manager Protocol (LMP) channel) with the audio source terminal 110. The controller 320 receives an audio stream as a sequence of blocks of audio data in messages through the broadcast channel B0. The controller 320 responds to each quality of receipt polling message from the audio source terminal 110 by determining an error metric for the audio data contained in both messages (e.g., by determining a number of errors in one or more of the received audio data messages or the number of missed packets) and transmitting a quality of reception feedback message, which contains the error metric, to the audio source terminal 110.

The controller 320 may identify whether a message containing audio data received from the audio source terminal 110 is repetitive of an earlier received message containing the audio data, and may respond to identification of a repetitive message by determining an error metric for the audio data contained in both messages and converting one of the two messages having a lower error metric into an audio stream that is converted by the DAC 340 into an analog signal that is played through the speaker 360.

The controller 320 can include Base Band processing (BB) circuitry 322, Hardware Compatibility protocol stack (HCI) circuitry 324, Logical Link Controller and Adaptation Protocol (L2CAP) circuitry 326, Service Discovery Protocol (SDP) circuitry 328, Audio/Video Distribution Transport Protocol (AVDTP) circuitry 330, AVDTP broadcast data handler circuitry 332, Advanced Audio Distribution Profile (A2DP) circuitry 334, and decoder circuitry 336. Except as otherwise described herein, various components of the controller 320 may operate as described in the Bluetooth specifications as is well known in the art. The HCI 324, BB 322, and RF transceiver 310 can be configured to transmit and receive Bluetooth Data to/from the audio source terminal 110. The L2CAP 326 can be configured to function as a multiplexer to forward data received over the bidirectional ACL control channel to the correct protocol handler and back.

During establishment of a communication channel, the normal flow as described in the A2DP specification over the AVDTP protocol may be used. However, instead of receiving encoded audio data over the bidirectional control channel, it is received through the broadcast channel B0. The audio data received via the broadcast channel B0 can be forwarded to the AVDTP 332, where duplicate audio data messages from repetitive broadcasts can be combined or filtered to discard one having a greater number of errors. The processed audio data can then be sent from the AVDTP broadcast data handler 332 to the A2DP 334 which operates with the decoder 336 to decode the audio data to, for example, generate stereo signals therefrom which are output through one or more DACs 340 to one or more speakers 360.

The decoder 336 can determine an error metric for the audio data during decoding (e.g., by determining a number of errors in the audio data). The A2DP 334 and/or the AVDTP 330 can respond to a quality of receipt polling message that is received from an audio source terminal 110, via the bidirectional control channel, by transmitting a quality of reception feedback message, which contains the error metric, through the RF transceiver 310 to the audio source terminal 110.

Figure 4:
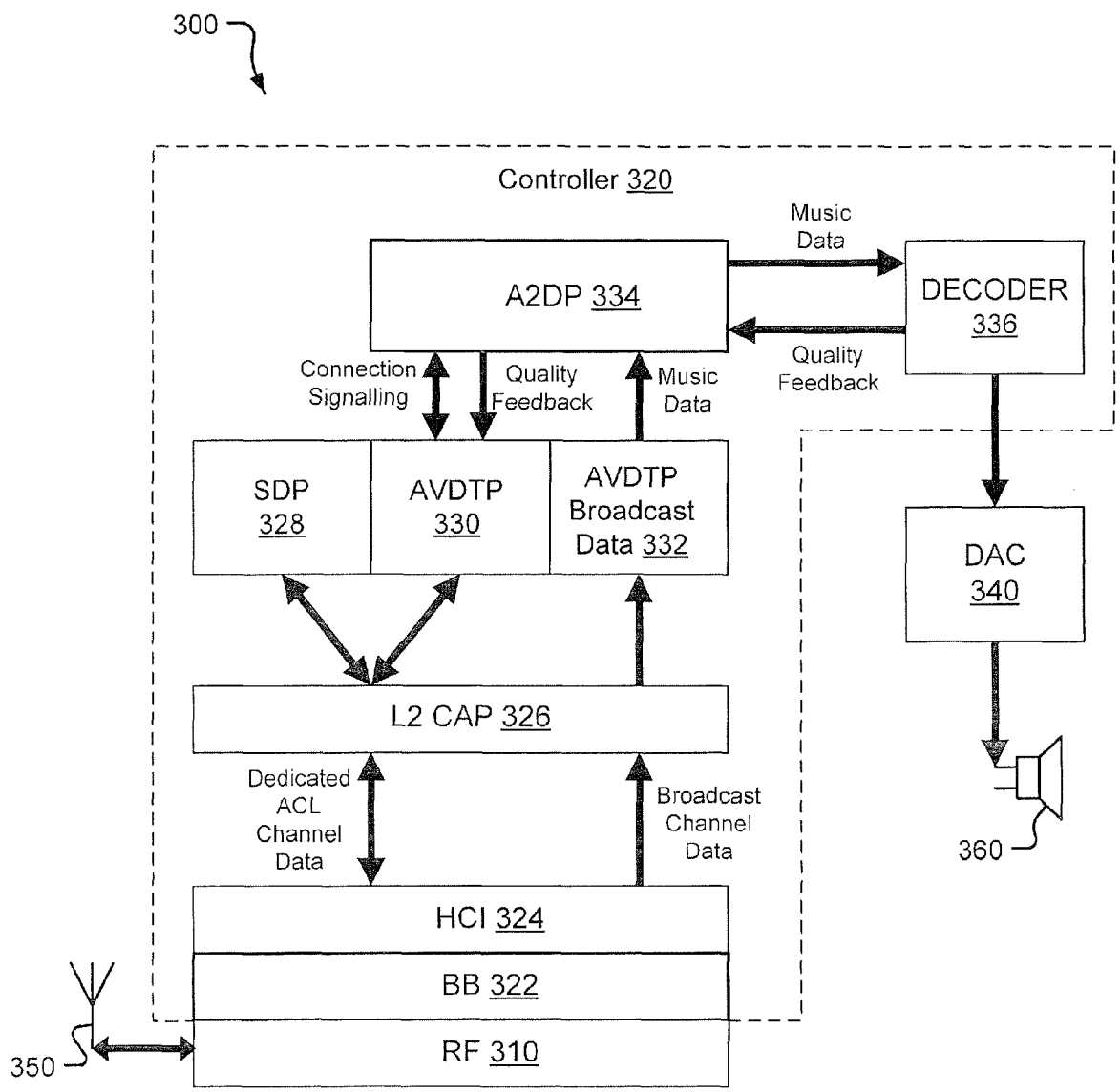
FIG. 4 is a block diagram of a speaker terminal in accordance with some embodiments of the present invention.
Figure 5:
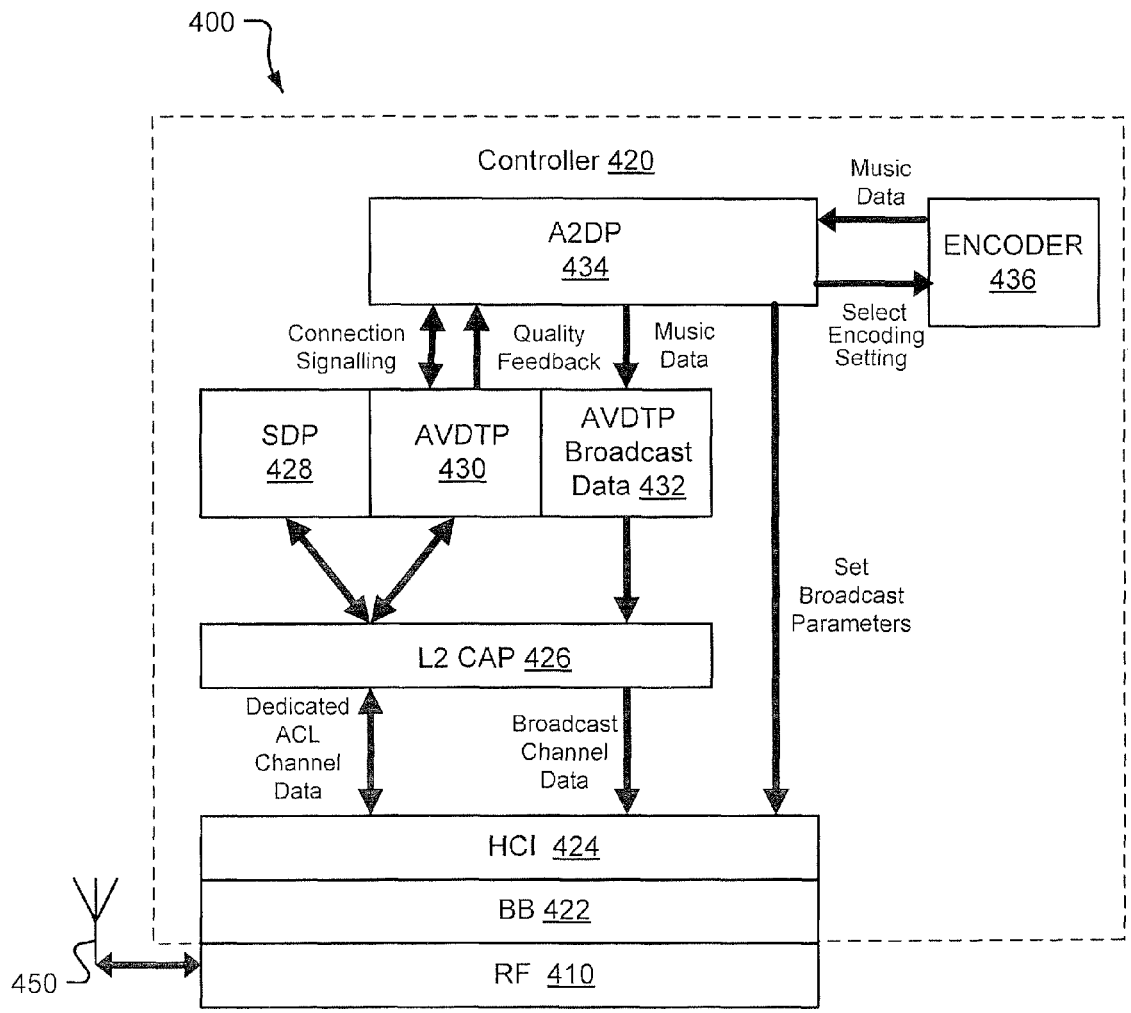
FIG. 5 is a block diagram of an audio source terminal in accordance with some embodiments of the present invention.

FIG. 4 is a block diagram of an audio source terminal 400 that is configured in accordance with some embodiments of the present invention. Referring to FIG. 4, the audio source terminal 400, which may be a Bluetooth enabled phone (e.g., audio source terminal 110), includes a RF transceiver circuit (RF front end) 410 and a controller circuit 420. The RF transceiver 410 is configured to communicate through an antenna 450 via wireless Bluetooth communication channels with the speaker terminals 120, 122, and 124.

The controller 420 is configured to communicate through the RF transceiver 410 to establish a broadcast channel B0 and a plurality of the bidirectional control channels D1, D2, and D3 (e.g., as Asynchronous Connectionless Link (ACL) Link Manager Protocol (LMP) channels) to the speaker terminals 120, 122, and 124.

The controller 420 transmits an audio stream as a sequence of blocks of audio data in messages through the broadcast channel B0 for receipt by all of the speaker terminals 120, 122, and 124. The controller 420 repetitively transmits a quality of receipt polling message to each of the speaker terminals 120, 122, and 124 to initiate transmission of quality of reception feedback messages from each of the speaker terminals 120, 122, and 124 to the audio source terminal 400. The RF transceiver 410 receives the quality of reception feedback messages through the bidirectional control channels D1, D2, and D3, and responds thereto by adapting the audio data messages that are transmitted to the speaker terminals through the broadcast channel in response to the quality of reception feedback message indicating that the quality has dropped below one or more defined threshold levels.

For example, the controller 420 may begin retransmitting audio data messages, increase a number of times that a same audio data message is retransmitted, change the modulation technique that is applied to the audio data messages for transmission to the speaker terminals 120, 122, and 124, and/or change the FEC that is applied to the audio data for transmission in response to a quality of reception feedback message indicating that the quality has dropped below one or more defined threshold levels, such as describe above.

The controller 420 can include BB circuitry 422, HCI circuitry 424, L2CAP circuitry 426, SDP circuitry 428, AVDTP circuitry 430, AVDTP broadcast data handler circuitry 432, A2DP circuitry 434, and encoder circuitry 436 which may operate with corresponding functionality to that describe above for the corresponding circuitry of the speaker terminal 300. The encoder 436 may operate to change the modulation technique that is applied to the audio data message for transmission to the speaker terminals 120, 122, and 124 and/or to change the FEC that is applied to the audio data for transmission in response to the quality of reception feedback message indicating that the quality has dropped below one or more defined threshold levels, such as describe above. The AVDTP broadcast data handler circuitry 432 or circuitry may control initiation of retransmission of the audio data messages and/or increase a number of times that a same audio data message is retransmitted in response to the quality of reception feedback message indicating that the quality has dropped below one or more defined threshold levels, such as describe above.

Although various separate functional blocks have been shown in the figures for purposes of illustration and discussion, it is to be understood that at least some of their functionality described herein may be integrated within a common integrated circuit package or distributed among more than one integrated circuit packages.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

What is claimed is:

1. A method comprising:
   establishing a broadcast channel for communication from an audio source terminal to a plurality of speaker terminals;
   establishing a plurality of bidirectional point-to-point control channels for controlling wireless communications between the audio source terminal and the speaker terminals, wherein each of the point-to-point control channels interconnect the audio source terminal and a different one of the speaker terminals;
   transmitting an audio stream as a sequence of blocks of audio data in messages from the audio source terminal through the broadcast channel for receipt by all of the speaker terminals;
   receiving a quality of reception feedback message at the audio source terminal from individual ones of the speaker terminals through respective ones of the point-to-point control channels; and
   adapting the audio data messages for transmission from the audio source terminal through the broadcast channel in response to the quality of reception feedback message.

2. The method of claim 1, further comprising:
   transmitting a quality of receipt polling message from the audio source terminal to each of the speaker terminals through respective ones of the point-to-point control channels to initiate transmission of the quality of reception feedback message from the speaker terminals to the audio source terminal.

3. The method of claim 1, wherein adapting the audio data messages that are transmitted from the audio source terminal to the speaker terminals comprises:
   retransmitting each audio data message from the audio source terminal through the broadcast channel to all of the speaker terminals in response to the quality of reception feedback message received from any one of the speaker terminals indicating that a quality at which the messages are received is below a first threshold level.

4. The method of claim 3, wherein adapting the audio data messages for transmission from the audio source terminal to the speaker terminals comprises:
   increasing a number of times that each audio data message is retransmitted from the audio source terminal through the broadcast channel to all of the speaker terminals in response to the quality of reception feedback message received from any one of the speaker terminals indicating that a quality at which the audio data messages is received is below a second threshold level that is lower than the first threshold level, wherein each audio data message is retransmitted adjacent to the same originally transmitted audio data message without any intervening other message containing other audio data.

5. The method of claim 1, wherein adapting the audio data messages for transmission from the audio source terminal to the speaker terminals comprises:
   applying a first modulation technique by the audio source terminal to modulate the audio data messages for transmission while the quality of reception feedback message received from all of the speaker terminals indicates that the quality at which the audio data messages is received is above a threshold level; and
   applying a second modulation technique, which is more tolerate of noisy communications through the broadcast channel than the first modulation technique, by the audio source terminal to modulate the audio data messages for transmission in response to the quality of reception feedback message received from any one of the speaker terminals indicating that the quality at which the audio data messages is received is below the threshold level.

6. The method of claim 5, wherein:
   applying the first modulation technique comprises applying Quadrature Phase Shift Keying (QPSK) by the audio source terminal to modulate the transmitted audio data messages while the quality of reception feedback message received from all of the speaker terminals indicates that the quality at which the audio data messages is received is above a threshold level; and
   applying the second modulation technique comprises applying Gaussian Frequency-Shift keying (GFSK) by the audio source terminal to modulate the transmitted audio data messages in response to the quality of reception feedback message received from any one of the speaker terminals indicating that the quality at which the audio data messages is received is below the threshold level.

7. The method of claim 6, wherein:
   receiving quality of reception feedback message at the audio source terminal from individual ones of the speaker terminals comprises applying GFSK demodulation to quality of reception feedback messages received through respective ones of the point-to-point control channels without changing to another modulation technique irrespective of the quality of reception feedback message.

8. The method of claim 5, further comprising:
transmitting modulation technique information, which identifies what modulation technique will be applied by the audio source terminal, from the audio source terminal to the speaker terminals through respective ones of the point-to-point control channels in response to the audio source terminal changing between the first and second type of modulation that it applies to the transmitted messages containing the audio data.

9. The method of claim 1, wherein adapting the audio data messages for transmission from the audio source terminal to the speaker terminals comprises:
applying a first forward error correction (FEC) code by the audio source terminal to the audio data messages for transmission while the quality of reception feedback message received from all of the speaker terminals indicates that the quality at which the audio data messages is received is above a threshold level; and
applying a second FEC code, which enables correction of a greater number of errors than the first FEC code, by the audio source terminal to the audio data messages for transmission in response to the quality of reception feedback message received from any one of the speaker terminals indicating that the quality at which the audio data messages is received is below the threshold level.

10. An audio source terminal comprising:
a RF transceiver circuit that is configured to communicate with a plurality of speaker terminals through a broadcast channel and a plurality of bidirectional point-to-point control channels; and
a controller that is configured to communicate through the RF transceiver circuit to establish the broadcast channel and the plurality of bidirectional point-to-point control channels to the speaker terminals, wherein each of the point-to-point control channels interconnect the audio source terminal with a different one of the speaker terminals, the controller is further configured to transmit an audio stream as a sequence of blocks of audio data in messages from the audio source terminal through the broadcast channel for receipt by all of the speaker terminals, to receive a quality of reception feedback message from individual ones of the speaker terminals through respective ones of the point-to-point control channels, and to adapt the audio data messages that are transmitted to the speaker terminals through the broadcast channel in response to the quality of reception feedback message.

11. The audio source terminal of claim 10, wherein:
the RF transceiver circuit comprises a Bluetooth transceiver; and
the controller is further configured to establish the broadcast channel as a Bluetooth unidirectional broadcast channel from the RF transceiver circuit to the speaker terminals, to establish the point-to-point control channels each as a Asynchronous Connectionless Link (ACL) Link Manager Protocol (LMP) channel between the RF transceiver circuit and a different one of the speaker terminals, to transmit the audio data messages according to an Advanced Audio Distribution Profile (A2DP) protocol through the broadcast channel for receipt by all of the speaker terminals, to repetitively transmit a quality of receipt polling message to each of the speaker terminals to initiate transmission of quality of reception feedback messages from each of the speaker terminals to the audio source terminal, and to adapt the audio data messages that are transmitted to the speaker terminals through the broadcast channel in response to the quality of reception feedback message.

12. The audio source terminal of claim 11, wherein:
the controller is further configured to include an A2DP identifier in the audio data messages that are transmitted through the broadcast channel for receipt by all of the speaker terminals.

13. The audio source terminal of claim 11, wherein:
the controller is further configured to repetitively transmit the quality of receipt polling message to each of the speaker terminals through respective ones of the point-to-point control channels to initiate transmission of quality of reception feedback messages from each of the speaker terminals to the audio source terminal through the respective point-to-point control channels.

14. The audio source terminal of claim 11, wherein:
the controller is further configured to retransmit each audio data message from the audio source terminal through the broadcast channel to all of the speaker terminals in response to the quality of reception feedback message received from any one of the speaker terminals indicating that a quality at which the audio data messages is received is below a first threshold level.

15. The audio source terminal of claim 14, wherein:
the controller is further configured to increase a number of times that each audio data message containing the audio data is retransmitted from the audio source terminal through the broadcast channel to all of the speaker terminals in response to the quality of reception feedback message received from any one of the speaker terminals indicating that a quality at which the audio data messages is received is below a second threshold level that is lower than the first threshold level, wherein each audio data message is retransmitted adjacent to the same originally transmitted audio data message without any intervening other message containing other audio data.

16. The audio source terminal of claim 11, wherein:
the controller is further configured to control the Bluetooth transceiver to apply Quadrature Phase Shift Keying (QPSK) to modulate the transmitted audio data messages in response to the quality of reception feedback message received from all of the speaker terminals indicating that the quality at which the audio data messages is received is above a threshold level, and to apply Gaussian Frequency-Shift keying (GFSK) to modulate the transmitted audio data messages in response to the quality of reception feedback message received from any one of the speaker terminals indicating that the quality at which the audio data messages is received is below the threshold level.

17. The audio source terminal of claim 11, wherein:
the Bluetooth transceiver is further configured to apply GFSK to modulate the quality of receipt polling messages that are transmitted to each of the speaker terminals without changing to another modulation technique irrespective of the quality of reception feedback messages.

18. The audio source terminal of claim 10, wherein:
the controller is further configured to apply a first forward error correction (FEC) code to the audio data messages for transmission while the quality of reception feedback message received from all of the speaker terminals indicates that the quality at which the audio data messages is received is above a threshold level, and to apply a second FEC code, which enables correction of a greater number of errors than the first FEC code, to the audio data messages for transmission in response to the quality of reception feedback message received from any one of the speaker terminals indicating that the quality at which the audio data messages is received is below the threshold level.

19. A speaker terminal comprising:

a RF transceiver circuit that is configured to communicate with an audio source terminal through a unidirectional broadcast channel and a bidirectional point-to-point control channel;

a speaker; and a controller that is configured to communicate through the RF transceiver circuit to establish the unidirectional broadcast channel and the bidirectional point-to-point control channel to the audio source terminal, to receive an audio stream as a sequence of blocks of audio data in messages from the audio source terminal through the unidirectional broadcast channel, and to respond to a quality of receipt polling message received from the audio source terminal through the bidirectional point-to-point control channel by transmitting a quality of reception feedback message through the bidirectional point-to-point control channel to the audio source terminal, and to convert the sequence of blocks of audio data received in the messages into an audio stream that is played through the speaker.

20. The speaker terminal of claim 19, wherein:

the controller is further configured to identify whether an audio data message received from the audio source terminal is repetitive of an earlier received audio data message, and to respond to identification of a repetitive audio data message by determining an error metric for the audio data contained in original and the repetitive audio data messages and converting one of those audio data messages having a lower error metric into the audio stream that is played through the speaker.

* * * * *